United States Patent
Callens et al.

(10) Patent No.: US 10,328,579 B2
(45) Date of Patent: Jun. 25, 2019

(54) UNIT FOR CUTTING THIN FILMS OF SYNTHETIC MATERIAL

(71) Applicant: CENTRE TECHNIQUE DES INDUSTRIES MÉCANIQUES, Senlis (FR)

(72) Inventors: Clément Callens, Ligné (FR); Franck Bordellier, Sainte-Luce-sur-Loire (FR); Elise Dreano, Nantes (FR)

(73) Assignee: CENTRE TECHNIQUE DES INDUSTRIES MECANIQUES (FR)

( * ) Notice: Subject to any disclaimer, the term of this patent is extended or adjusted under 35 U.S.C. 154(b) by 0 days.

(21) Appl. No.: 15/573,513

(22) PCT Filed: Jun. 13, 2016

(86) PCT No.: PCT/FR2016/051426
§ 371 (c)(1),
(2) Date: Nov. 13, 2017

(87) PCT Pub. No.: WO2016/198810
PCT Pub. Date: Dec. 15, 2016

(65) Prior Publication Data
US 2018/0104824 A1    Apr. 19, 2018

(30) Foreign Application Priority Data
Jun. 12, 2015 (FR) .................................. 15 55400

(51) Int. Cl.
*B25J 11/00* (2006.01)
*B26D 7/20* (2006.01)
(Continued)

(52) U.S. Cl.
CPC .......... *B25J 11/0055* (2013.01); *B26D 7/086* (2013.01); *B26D 7/20* (2013.01); *B26F 1/3813* (2013.01); *B26D 5/00* (2013.01); *B26D 5/02* (2013.01)

(58) Field of Classification Search
CPC ....... B25J 11/0055; B26F 1/3813; B26F 1/00; B26F 2210/12; B26D 7/20; B26D 5/00; B26D 7/086; B26D 5/02; B26D 7/018
(Continued)

(56) References Cited

U.S. PATENT DOCUMENTS 3,719,113 A    3/1973  Gerber et al. ................. 83/56
4,619,170 A *  10/1986 Maier ................. B23Q 9/0042
                                                       30/372
(Continued)

FOREIGN PATENT DOCUMENTS

CH    702 818 A2    9/2011
DE    35 29 686 A1    2/1987
(Continued)

OTHER PUBLICATIONS

International Search Report dated Sep. 12, 2016 in corresponding PCT International Application No. PCT/FR2016/051426.
(Continued)

*Primary Examiner* — Ghassem Alie
(74) *Attorney, Agent, or Firm* — Ostrolenk Faber LLP

(57) ABSTRACT

A unit for cutting thin films of synthetic material has a worktable and a cutting head. The cutting head has a shoe with a smooth bearing surface and a cutting member that can project from the smooth bearing surface. The smooth bearing surface is intended to be applied against the thin film of synthetic material, while the shoe is moved substantially parallel to the worktable so that it can cut the thin film of synthetic material. The worktable has a non-slip coating
(Continued)

with a static coefficient of friction in relation to the synthetic material, while the smooth bearing surface has a dynamic coefficient of friction in relation to the synthetic material. The dynamic coefficient of friction is lower than the static coefficient of friction.

9 Claims, 1 Drawing Sheet

(51) Int. Cl.
  *B26D 7/08* (2006.01)
  *B26F 1/38* (2006.01)
  *B26D 5/00* (2006.01)
  *B26D 5/02* (2006.01)

(58) Field of Classification Search
  USPC ............... 83/318, 56, 100, 577, 409, 132; 414/225.01; 409/80, 84, 107, 132, 217, 409/224, 259
  See application file for complete search history.

(56) References Cited

U.S. PATENT DOCUMENTS

| 5,611,222 | A | * | 3/1997 | Preece | ............... C14B 1/18 69/21.5 |
| 2008/0273951 | A1 | | 11/2008 | Stein | ............... 414/225.01 |
| 2018/0257230 | A1 | * | 9/2018 | Kinoshita | ............... B25J 13/08 |

FOREIGN PATENT DOCUMENTS

| DE | 103 14 444 A1 | 10/2004 |
| FR | 2 114 425 A5 | 6/1972 |
| JP | H04-341839 A | 11/1992 |
| WO | WO 88/04676 A1 | 6/1988 |
| WO | WO 2006/045595 A1 | 5/2006 |

OTHER PUBLICATIONS

Written Opinion dated Sep. 12, 2016 in corresponding PCT International Application No. PCT/FR2016/051426.

* cited by examiner ance the non-slip coating is applied

UNIT FOR CUTTING THIN FILMS OF SYNTHETIC MATERIAL

CROSS-REFERENCE TO RELATED APPLICATIONS

The present application is a 35 U.S.C. §§ 371 national phase conversion of PCT/FR2016/051426, filed Jun. 13, 2016, which claims priority to French Patent Application No. 1555400, filed Jun. 12, 2015, the contents of which are incorporated herein by reference. The PCT International Application was published in the French language.

TECHNICAL FIELD

The present invention relates to a unit for cutting thin layers of synthetic material.

One intended field of application is in particular, but not exclusively, that of cutting layers of polymer material and more specifically composite material.

BACKGROUND OF THE INVENTION

Known cutting units serve for cutting layers of textile material in large numbers for the purpose of producing clothing at high rates.

These units comprise a flat worktable in which suction openings are created. They also comprise a beam that is mounted so as to be able to move in translation in a first direction over the worktable, and a cutting head that is itself mounted so as to be able to move in translation on the beam in a direction that is essentially perpendicular to the first direction. The cutting head comprises a shoe having a bearing surface, and a cutting blade that is designed to oscillate while projecting from the bearing surface.

Thus, layers of textile material are stacked on the worktable and an airtight plastic film is applied to the whole in order to be able to compress all of these layers by sucking air through the suction openings of the worktable. The whole then forms, in one block, a mat that is as one with the worktable and easier to cut.

The unit also comprises a control device which, using a predefined cutting program, makes it possible not only to control the oscillations of the cutting blade but also to simultaneously move in translation the beam and the cutting head in order to be able to cut predetermined shapes from the set of layers compressed into a mat. Thus, a plurality of identical pieces of textile material are cut.

It has been imagined to use such a technique to cut pieces from a layer of flexible polymer material. Reference can in particular be made to document US 2008/0273951. This document describes a perforated worktable with which the flexible layer can be held in a fixed position on the worktable, and a cutting head having a shoe with which it is possible to remove folds to the front of the shoe with respect to the direction in which it is moved.

These units are relatively complex to implement and, hence, more costly.

In addition, one problem which arises and which the present invention aims to solve is that of providing a simpler cutting unit with which it is possible to cut pieces from thin layers of synthetic material with high productivity.

SUMMARY OF THE INVENTION

To that end, what is proposed is a unit for cutting thin layers of synthetic material, said unit comprising on one hand a worktable for receiving a thin layer of synthetic material and on the other hand a cutting head including a shoe having a smooth bearing surface and a cutting member that can project from said smooth bearing surface, said smooth bearing surface being intended to be applied against said thin layer of synthetic material, while said shoe is moved substantially parallel to said worktable along predefined trajectories so that it can cut said thin layer of synthetic material. Said worktable comprises a non-slip coating having a static coefficient of friction in relation to said synthetic material, while said smooth bearing surface has a dynamic coefficient of friction in relation to said synthetic material, said dynamic coefficient of friction being lower than said static coefficient of friction so as to be able to hold said layer of synthetic material in a fixed position against said worktable when said shoe is made to slide over said layer of synthetic material.

Thus, one feature of the invention is to be found in the simultaneous implementation of a non-slip coating on the worktable and of a shoe having a smooth bearing surface, allowing the shoe to move against the thin layer of synthetic material while the latter is held in a fixed position on the worktable. It will be seen that the shoe exerts sufficient pressure on the thin layer of synthetic material such that the latter grips the non-slip coating and is held in a fixed position. However, this pressure may not exceed a limit value beyond which the friction forces between the smooth bearing surface and the thin layer of synthetic material might increase. This pressure is for example between 7000 Pa and 18 000 Pa.

Thus, simply by implementing a non-slip coating having a static coefficient of friction in relation to the synthetic material that is greater than the dynamic coefficient of friction between the smooth bearing surface of the shoe and the synthetic material, the shoe is moved over the surface of the layer of synthetic material for the purpose of cutting the latter without it being necessary to implement suction means that are relatively complex and costly. In addition, one will choose a non-slip coating and a shoe where the static coefficient of friction and the dynamic coefficient of friction are respectively as far from one another as possible.

According to one particularly advantageous feature of the invention, that said thin layer of synthetic material is a layer of composite material. The composite material is made from a matrix of polymer material in which are embedded fibers of a reinforcing material. The matrix is for example made of a thermoplastic material, polyamide or polyethylene and includes, for example, longitudinal glass or carbon fibers.

According to another particularly advantageous feature of the invention, said non-slip coating is made of an elastomer. The static coefficient of friction depends essentially on the non-slip coating and its surface state. An elastomer-type material, for example a silicone or polyurethane material, has excellent non-slip qualities.

Furthermore, said shoe is preferably made of a metallic material. Thus, the shoe is made of a more rigid material and the bearing surface is treated so as to be flat and without roughness in order for its dynamic coefficient of friction in relation to the synthetic material to be as low as possible.

One variant embodiment implements shoes made of a rigid polymer material and having a low coefficient of friction. One example of a rigid polymer material is polyether ether ketone or PEEK.

Furthermore, the unit advantageously further comprises a control device for controlling the movement of said cutting head. Preferably, said control device comprises a robot having a distal arm bearing said cutting head. Thus, by virtue of the robot whose distal arm can easily be controlled from outside the working space, it is easy to gain access to the worktable, either to apply a thin layer of synthetic material or to remove the pieces cut from said synthetic material.

In addition, said cutting member comprises a sonotrode and a transducer. Thus, ultrasonic mechanical waves are used to cut the layer of synthetic material, which makes it possible to produce clean edges. Indeed, when composite materials are cut, the fibers that they contain tend to project from the edges. By virtue of ultrasonic cutting, these edges are essentially melted, and hence regular.

Advantageously, said smooth bearing surface has circular symmetry while said cutting member projects from the center of said smooth bearing surface. Thus, when the cutting head is rotated in the plane, against the layer of synthetic material, in order to orient the cutting member in the direction of the cut, the distribution of tangential forces acting on the synthetic material cause no fold or irregularity.

It will be seen that the smooth bearing surface may have other shapes.

In addition, the cutting unit according to the invention makes it possible to cut a layer of synthetic material having zones of different thicknesses.

Preferably, said transducer causes the sonotrode to vibrate at a frequency of between 20 kHz and 40 kHz. This produces an optimum cut quality of the synthetic material.

BRIEF DESCRIPTION OF THE DRAWINGS

Other characteristics and advantages of the invention will become clear upon reading the below description of a particular embodiment of the invention, provided by way of non-limiting example, with reference to the appended drawings, in which.

DESCRIPTION OF PREFERRED EMBODIMENTS

Figure 1:
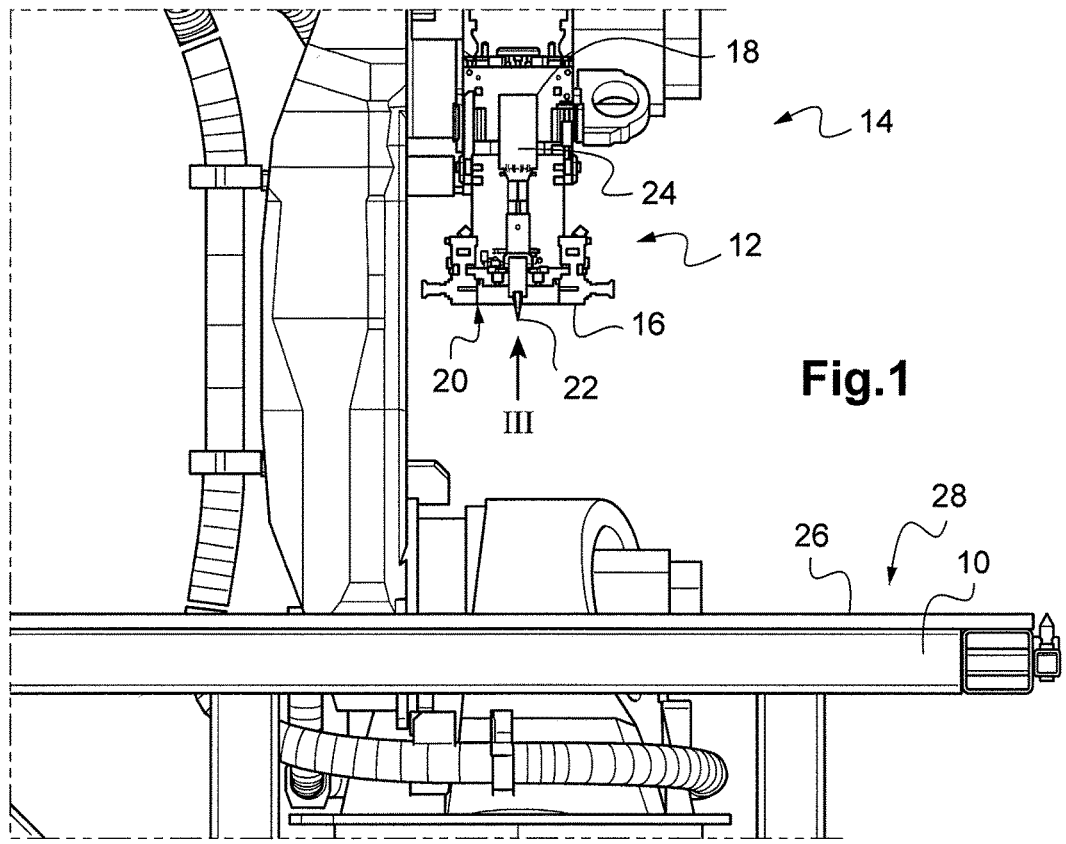
FIG. 1 is a schematic, partial front view showing a cutting unit according to the invention.

FIG. 1 shows, in a front view, a flat support 10 and a cutting head 12 borne by a robot 14 that is designed to move over the flat support 10. The cutting head 12 comprises a shoe 16 that is mounted on a final arm, or distal arm 18, of the robot 14. The shoe 16, made of a metal material and more specifically steel, has a smooth, flat bearing surface 20 and a blade 22 mounted on a sonotrode projecting from the smooth bearing surface 20. The bearing surface 20 is rendered particularly smooth by a surface treatment. This is a treatment whose purpose is to harden the surface and remove roughness therefrom. For example, the steel is of type Z160CDV12, it is quenched and then mirror-polished, after which it undergoes Ionbond 90 treatment.

Figure 3:
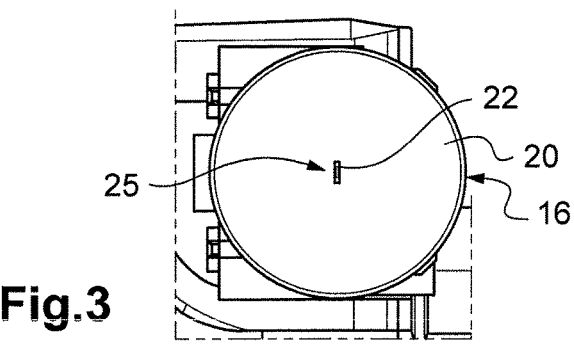
FIG. 3 is a schematic view from below, along the arrow III, of an element of the unit shown in FIG. 1.

Reference is made to FIG. 3, showing the bearing surface 20 of the shoe 16, before returning to FIG. 1. It has circular symmetry and the blade 22 projects from the center 25.

The blade 22 extends in continuation of a transducer 24 installed above the cutting head 12 in the direction of the distal arm 18. The transducer 24 then causes the blade 22 to vibrate at a frequency of 30 kHz.

The robot 14 can move the cutting head 12 not only according to a vertical component, but also according to horizontal components, as will be explained in greater detail hereinbelow.

The flat support 10 is covered with a non-slip coating 26 made of a silicone elastomer material, and they thus form a worktable 28. An exemplary implementation uses a polyurethane coating having a thickness of 5 mm and a Shore A hardness of 90. The non-slip coating 26 is for example secured to the flat support 10 by means of an adhesive, and they have a free receiving surface 29.

Figure 2:
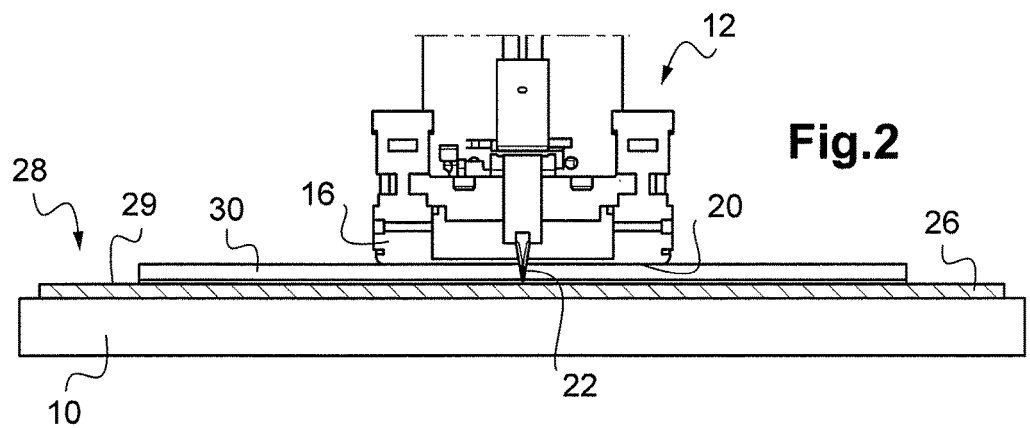
FIG. 2 is a schematic detail view of the unit shown in FIG. 1, in one mode of operation.

Reference is made to FIG. 2 to describe in greater detail the operation of the cutting head 12 with respect to the worktable 10 and the non-slip coating 26.

FIG. 2 shows the worktable 28 and the cutting head 12. The figure also shows the non-slip coating 26 and the flat support 10 which together form the worktable 28.

A thin layer 30 of composite material is laid flat between the cutting head 12 and the worktable 28. This thin layer 30 is held between the bearing surface 20 of the shoe 16 and the free receiving surface 29 of the non-slip coating 26. The composite material, of which the thin layer 30 is made, consists for example of a matrix of polyamide, polyamide 6,6, reinforced by longitudinal glass fibers. The advantage of such a composite material lies in the use of a thermoplastic matrix.

Thus, the pressure of the cutting head 12 on the thin layer 30 will make the latter able to grip the non-slip coating 26. Indeed, friction forces act between the thin layer 30 and the non-slip coating 26, which forces resolve into a component normal to the interface, which presses the thin layer 30 against the non-slip coating 26, and a tangential component that opposes the two sliding relative to one another. Now, by virtue of the relatively high static coefficient of friction between the thin layer 30 and the non-slip coating 26, the tangential component of the friction forces does not reach the threshold value beyond which the thin layer 30 of composite material would be made to slide on the non-slip coating 26. This static coefficient of friction between the thin layer 30 and the non-slip coating 26, for a given composite material, depends on the nature of the non-slip coating 26 and its surface state. The choice of the elastomer material provides a relatively high static coefficient of friction.

It will be seen that the pressure of the cutting head 12 on the thin layer 30 is advantageously between 200 N and 500 N. This pressure is for example 400 N over an area of 28 340 $mm^2$ of the bearing surface 20 of the shoe 16, that is to say approximately 14.1 kPa.

The tangential component of the friction forces does not reach the aforementioned threshold value beyond which the thin layer 30 of composite material might be made to slide on the non-slip coating 26 because, at the interface between the bearing surface 20 of the shoe 16 and the thin layer 30 of composite material, the dynamic friction coefficient is relatively low, and is less than the aforementioned static friction coefficient. Also, the state of the bearing surface 20 of the shoe 16 greatly reduces the threshold value for the tangential component of the friction forces between the bearing surface 20 and the thin layer 30, and the tangential component is then much larger, such that the friction forces between the shoe 16 and the thin layer 30 are relatively small.

Thus, the blade 22 which is to cut through the thin layer 30 of composite material will be able to be moved along predefined trajectories, moving the cutting head 12 in a plane parallel to the flat support 10 while the thin layer 30 of composite material is held in a fixed position with respect to the worktable 28. Similarly, the blade 22 which is vibrated cuts the thin layer 30 of composite material.

Furthermore, this association of ultrasounds with a cutting blade makes it possible to minimize the cutting force and thus to reduce the risk of slippage of the product that is to be cut.

The robot 14 is controlled by a control program (not shown) with which it is possible to control the cutting head 12 according to a plurality of trajectories, thus making it possible to cut a plurality of pieces of composite material according to predefined shapes.

Such pieces of composite material can then be assembled for subsequent thermoforming.

The invention claimed is:

1. A system comprising a thin layer of synthetic material; and a unit for cutting said thin layer of synthetic material, said unit comprising on one hand a worktable for receiving said thin layer of synthetic material and on the other hand a cutting head including a shoe having a smooth bearing surface and a cutting member that projects from said smooth bearing surface, said smooth bearing surface being intended to be applied against said thin layer of synthetic material, while said shoe is moved substantially parallel to said worktable along predefined trajectories so that said cutting member can cut said thin layer of synthetic material;

wherein said cutting member comprises a sonotrode and a transducer, said worktable comprises a non-slip coating having a static coefficient of friction in relation to said synthetic material, said smooth bearing surface has a dynamic coefficient of friction in relation to said synthetic material, said dynamic coefficient of friction is lower than said static coefficient of friction so as to be able to hold said layer of synthetic material in a fixed position against said worktable when said shoe is made to slide over said layer of synthetic material, and said smooth bearing surface is continuous.

2. The system as claimed in claim 1, wherein said smooth bearing surface is designed to be pressed against said thin layer of synthetic material with a pressure of between 7000 Pa and 18000 Pa.

3. The system as claimed in claim 1, wherein said thin layer of synthetic material is a layer of composite material comprising a matrix of polymer material in which are embedded fibers of a reinforcing material.

4. The system as claimed in claim 1, wherein said non-slip coating is made of an elastomer.

5. The system as claimed in claim 1, wherein said shoe is made of a metallic material.

6. The system as claimed in claim 1, further comprising a control device for controlling the movement of said cutting head.

7. The system as claimed in claim 6, wherein said control device comprises a robot having a distal arm bearing said cutting head.

8. The system as claimed in claim 1, wherein said smooth bearing surface has circular symmetry and said cutting member projects from the center of said smooth bearing surface.

9. The system as claimed in claim 1, wherein said transducer causes the sonotrode to vibrate at a frequency of between 20 kHz and 40 kHz.

* * * * *